(12) United States Patent
Burgermeister

(10) Patent No.: US 12,362,682 B2
(45) Date of Patent: Jul. 15, 2025

(54) FREQUENCY CONVERTER WITH GROUND FAULT DETECTION

(71) Applicant: Lenze Swiss AG, Romanshorn (CH)

(72) Inventor: Andreas Burgermeister, Mauren (CH)

(73) Assignee: Lenze Swiss AG, Romanshorn (CH)

( * ) Notice: Subject to any disclaimer, the term of this patent is extended or adjusted under 35 U.S.C. 154(b) by 0 days.

(21) Appl. No.: 17/896,132

(22) Filed: Aug. 26, 2022

(65) Prior Publication Data

US 2023/0060651 A1 Mar. 2, 2023

(30) Foreign Application Priority Data

Aug. 27, 2021 (DE) .................... 10 2021 209 428.7

(51) Int. Cl.
*H02M 7/5387* (2007.01)
*H02M 1/32* (2007.01)

(52) U.S. Cl.
CPC ......... *H02M 7/5387* (2013.01); *H02M 1/325* (2021.05)

(58) Field of Classification Search
CPC ...... H02M 1/0009; H02M 1/32; H02M 1/325; H02M 5/00; H02M 5/40; H02M 5/42; H02M 5/44; H02M 5/45; H02M 5/4505; H02M 5/451; H02M 5/452; H02M 5/458; H02M 5/4585; H02M 7/42; H02M 7/44; H02M 7/515; H02M 7/537;
(Continued)

(56) References Cited

U.S. PATENT DOCUMENTS

| 2002/0172063 A1* | 11/2002 | Link | H02M 5/4585 |
| | | | 363/132 |
| 2013/0322133 A1* | 12/2013 | Li | G01R 31/52 |
| | | | 324/509 |

(Continued)

FOREIGN PATENT DOCUMENTS

| JP | 2004135440 A | * | 4/2004 |
| JP | 2009033938 A | * | 2/2009 |
| JP | 2011-193584 A | | 9/2011 |

OTHER PUBLICATIONS

English translation of JP-2009033938-A. (Year: 2009).*
(Continued)

*Primary Examiner* — Thienvu V Tran
*Assistant Examiner* — Carlos O Rivera-Perez
(74) *Attorney, Agent, or Firm* — Crowell & Moring LLP

(57) ABSTRACT

A frequency converter has a first intermediate circuit arm on which a positive intermediate circuit potential is present during operation, a second intermediate circuit arm on which a negative intermediate circuit potential is present during operation, and an inverter having first and second input terminals. The inverter has a number of bridge arms, each of which has an upper and a lower semiconductor switching device. The upper and lower switching devices are looped in series between the first and second input terminals. A connection node of the upper and lower switching devices forms an inverter output terminal. A reactor is looped-in between the first circuit arm and the first input terminal. A shunt resistor is looped-in between the second circuit arm and the second input terminal. An evaluation unit detects, based on a voltage across the shunt resistor, a ground fault on the upper semiconductor switching devices of the inverter.

3 Claims, 1 Drawing Sheet

(58) Field of Classification Search
CPC ........... H02M 7/53838; H02M 7/5387; H02M 7/53871; H02M 7/539; H02H 9/02–028; H02H 9/08; H02H 3/16–17
USPC .... 363/1, 10, 16, 17, 34, 35, 37, 40, 50–58, 363/131–134, 157, 159, 163, 165; 323/219, 276–278, 351; 361/42–50, 78, 361/79, 87, 93.1–102
See application file for complete search history.

(56) References Cited

U.S. PATENT DOCUMENTS

2019/0115847 A1* 4/2019 Göpfrich ............... H02M 7/219
2021/0063494 A1* 3/2021 Katsukura ................ H02H 3/16

OTHER PUBLICATIONS

English translation of JP-2004135440-A. (Year: 2004).*
German-language Office Action issued in German Application No. 10 2021 209 428.7 dated Jul. 7, 2022 with English translation (18 pages).
Erdschluss, Wikipedia, Version dated Nov. 19, 2019 (two (2) pages).

* cited by examiner

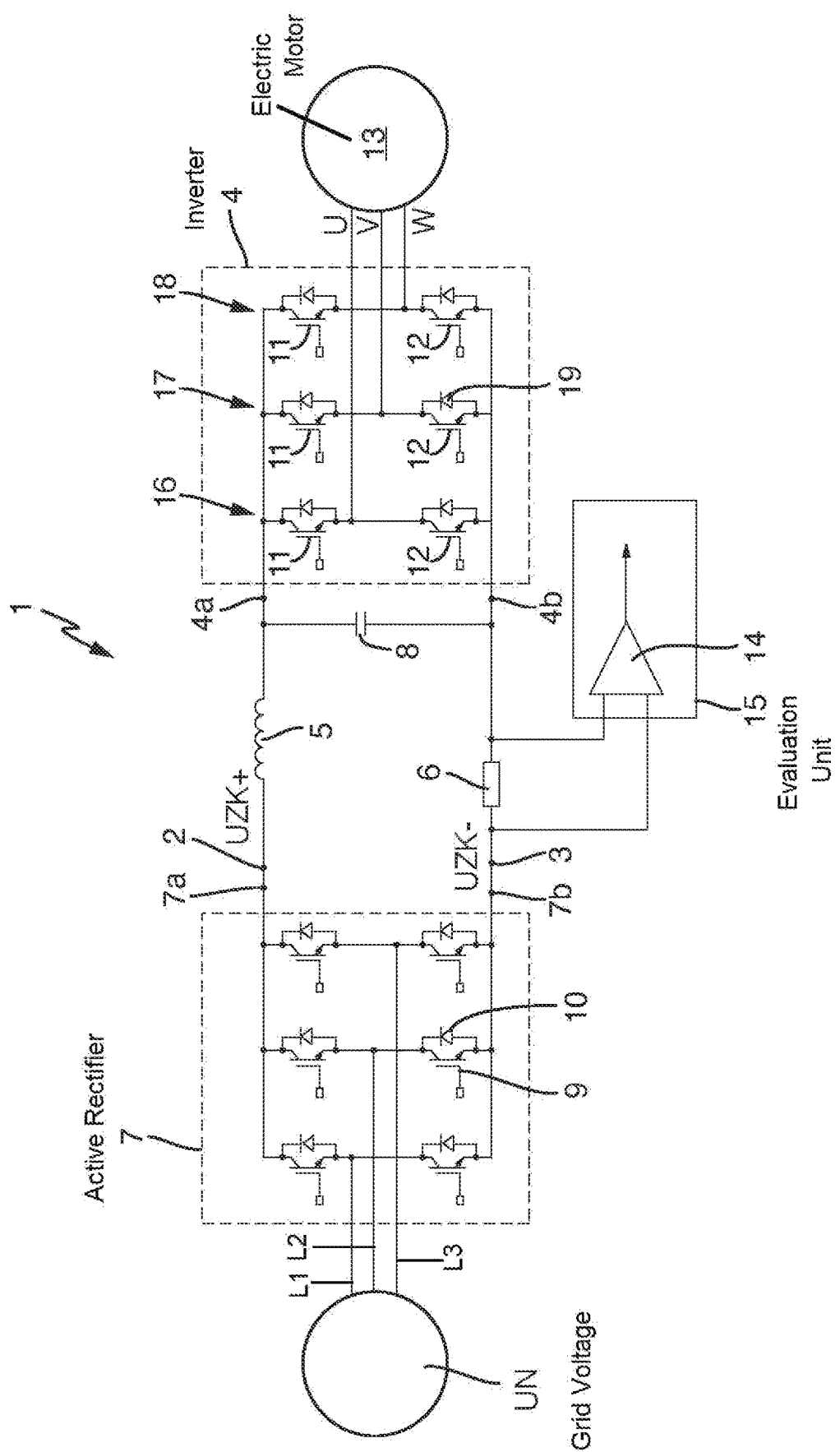

FREQUENCY CONVERTER WITH GROUND FAULT DETECTION

CROSS REFERENCE TO RELATED APPLICATION

This application claims priority under 35 U.S.C. § 119 from German Patent Application No. 10 2021 209428.7, filed Aug. 27, 2021, the entire disclosure of which is herein expressly incorporated by reference.

BACKGROUND AND SUMMARY OF THE INVENTION

The object of the invention is the provision of a frequency converter which permits the detection of a ground fault in the simplest and most reliable manner possible.

The frequency converter conventionally comprises an intermediate circuit branch on which a positive intermediate circuit potential is present during the operation of the frequency converter. Correspondingly, the frequency converter comprises a second intermediate circuit branch, on which a negative intermediate circuit potential is present during the operation of the frequency converter. The potential different between the positive and negative intermediate circuit potential is described as the intermediate circuit voltage.

The frequency converter further comprises a conventional inverter having a first input terminal and a second input terminal. The inverter comprises a number of bridge arms, for example exactly three bridge arms, in a B6 topology. A respective bridge arm comprises an upper semiconductor switching device, for example in the form of an insulated-gate bipolar transistor (IGBT), and a lower semiconductor switching device, for example also in the form of an IGBT. The upper semiconductor switching device and the lower semiconductor switching device are looped-in in series between the first input terminal and the second input terminal. A connection node of the upper semiconductor switching device and the lower semiconductor switching device forms an output terminal of the inverter at which, typically, one of the inverter phases is delivered. In this regard, reference may be made to the relevant specialized literature. The inverter is typically employed for the actuation of a three-phase AC motor.

The frequency converter further comprises a reactor or coil, which is looped-in between the first intermediate circuit arm and the first input terminal of the inverter.

The frequency converter further comprises a shunt resistor, which is looped-in between the second intermediate circuit arm and the second input terminal of the inverter.

The frequency converter further comprises an evaluation unit which is configured, on the basis of a voltage across the shunt resistor, to detect a ground fault on the upper semiconductor switching device of the inverter. For example, the evaluation unit can detect a ground fault of this type by the identification of a voltage jump in excess of a predefined voltage threshold.

In one embodiment, the frequency converter comprises a bidirectional power converter. The power converter comprises a first output terminal, which is connected to the first intermediate circuit arm, and comprises a second output terminal, which is connected to the second intermediate circuit arm.

In one embodiment, the bidirectional power converter is self-commutated.

In one embodiment, the bidirectional power converter is a line-commutated active rectifier.

In one embodiment, the frequency converter comprises an intermediate circuit capacitor, which is looped-in between the first intermediate circuit arm and the second intermediate circuit arm.

In one embodiment, the power converter and the intermediate circuit capacitor are components of a fundamental frequency front end (F3E). The power converter is typically an active line-commutated rectifier, and the intermediate circuit capacitor has a comparatively low capacitance. With respect to the F3E standards, reference should also be made to the relevant specialized literature.

According to the invention, a ground fault current measurement is executed by means of the shunt resistor in the current path of the negative intermediate circuit potential, for both high-side and low-side ground faults.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic circuit diagram of a frequency converter having a fundamental frequency front end and a ground fault detection function according to an embodiment of the invention.

DETAILED DESCRIPTION OF THE DRAWING

FIG. 1 shows a circuit diagram of a frequency converter 1, comprising a first intermediate circuit arm 2, on which a positive intermediate circuit potential UZK+ is present during the operation of the frequency converter 1, a second intermediate circuit arm 3, on which a negative intermediate circuit potential UZK− is present during the operation of the frequency converter 1, an inverter 4 having a first input terminal 4a and a second input terminal 4b, a reactor 5, which is looped-in between the first intermediate circuit arm 2 and the first input terminal 4a of the inverter 4, a shunt resistor 6, which is looped-in between the second intermediate circuit arm 3 and the second input terminal 4b of the inverter 4, an evaluation unit 15 which is configured, on the basis of a voltage across the shunt resistor 6, to detect a ground fault in the inverter 4, and an optional bidirectional power converter 7.

The power converter 7 is a self-commutated or line-commutated rectifier having a first output terminal 7a, which is connected to the first intermediate circuit arm 2, and having a second output terminal 7b, which is connected to the second intermediate circuit arm 3.

The frequency converter 1 comprises an intermediate circuit capacitor 8, which is looped-in between the first intermediate circuit arm 2 and the second intermediate circuit arm 3.

The bidirectional power converter 7 in the form of the self-commutated or line-commutated active rectifier, in a B6 topology, comprises conventional semiconductor switching device 9, respectively having parallel-connected power diodes 10 in the circuit configuration represented, wherein the semiconductor switching device 9, by conventional line commutation, are actuated in accordance with a time characteristic of phase voltages on the phases L1, L2 or L3 of a three-phase AC grid voltage UN. In this regard, reference may also be made to the relevant specialized literature.

The inverter 4, in a B6 topology, conventionally comprises three bridge arms 16, 17, 18, wherein each of the bridge arms 16, 17, 18 comprises an upper semiconductor switching device 11 and a lower semiconductor switching device 12. The upper semiconductor switching device 11 and the lower semiconductor switching device 12 are looped-in in series between the first input terminal 4a and the second input terminal 4b. A connection node of the upper semiconductor switching device 11 and the lower semiconductor switching device 12 forms one of the output terminals U, V, W of the inverter 4, to which, for example, a three-phase electric motor 13 can be connected. In each case, freewheeling diodes 19 are parallel-connected to the semiconductor switching devices 11 and 12. The semiconductor switching devices 11 and 12 are conventionally actuated at a (PWM) switching frequency. In this regard, reference may also be made to the relevant specialized literature.

The bidirectional line-commutated active rectifier 7 and the intermediate circuit capacitor 8 are components of a fundamental frequency front end (F3E).

The invention permits the effective protection of the frequency converter 1 in the event of a ground fault on the phase terminals U, V or W.

By means of the (storage) reactor 5 in the path of the upper intermediate circuit potential UZK+ and the shunt resistor 6 in the path of the negative intermediate circuit potential UZK−, a ground fault can also be detected during the conducting phase of an upper semiconductor switching device 11 of the inverter 4.

In the event, for example, of a ground fault on the phase terminal U during the conducting phase of an upper semiconductor switching device 11, the potential UZK+ declines abruptly. As the impedance of the reactor 5 in this frequency range is very high, the intermediate circuit capacitor 8 transmits the negative voltage jump to the shunt resistor 6. In an active F3E feedback arrangement, this negative voltage jump generates a current in the shunt resistor 6, which is then amplified by means of an optional measuring amplifier 14 of the evaluation unit 15, and can be employed for the execution of an overcurrent disconnection. The same applies, correspondingly, to the conducting phase of a lower semiconductor switching device 12.

Ground fault detection is also possible, in the same manner, in the case of an external DC supply which replaces the power converter 7.

By means of the invention, failure probability of the frequency converter 1 in the event of a ground fault is thus significantly reduced. Moreover, frequency converters with emitter shunt current measurement are also protected against ground faults.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A frequency converter, comprising:
    a first intermediate circuit arm, on which a positive intermediate circuit potential is present during operation of the frequency converter;
    a second intermediate circuit arm, on which a negative intermediate circuit potential is present during the operation of the frequency converter;
    an inverter having a first input terminal and a second input terminal, wherein the inverter comprises a number of bridge arms, wherein each of the bridge arms comprises an upper semiconductor switching device and a lower semiconductor switching device, wherein the upper semiconductor switching device and the lower semiconductor switching device are looped-in in series between the first input terminal and the second input terminal, and wherein a connection node of the upper semiconductor switching device and the lower semiconductor switching device forms an output terminal of the inverter;
    a reactor, which is looped-in between the first intermediate circuit arm and the first input terminal of the inverter;
    a shunt resistor, which is looped-in between the second intermediate circuit arm and the second input terminal of the inverter;
    an evaluation unit which is configured to detect a ground fault on the upper semiconductor switching device of the inverter based on a voltage across the shunt resistor;
    an intermediate circuit capacitor, which is looped-in between the first input terminal of the inverter and a connection node between a terminal of the shunt resistor and the second input terminal of the inverter; and
    a bidirectional power converter, wherein:
        the bidirectional power converter comprises a first output terminal, which is connected to the first intermediate circuit arm;
        the bidirectional power converter comprises a second output terminal, which is connected to the second intermediate circuit arm; and
        the bidirectional power converter and the intermediate circuit capacitor are components of a fundamental frequency front end.

2. The frequency converter according to claim 1, wherein the bidirectional power converter is self-commutated.

3. The frequency converter according to claim 1, wherein the bidirectional power converter is a line-commutated rectifier.

* * * * *